(12) United States Patent
Chien et al.

(10) Patent No.: US 7,395,604 B2
(45) Date of Patent: Jul. 8, 2008

(54) LASER LEVEL WITH TEMPERATURE CONTROL DEVICE AND TEMPERATURE CONTROL METHOD THEREOF

(75) Inventors: Pie-Yau Chien, Taichung (TW); Hua-Tang Liu, Taichung (TW); Yi-qi Li, Taichung (TW); Yong-ce Qi, Taichung (TW); Zhang-yong Jian, Taichung (TW); Yue-ye Chen, Taichung (TW)

(73) Assignee: Asia Optical Co., Inc., Hsin-Chu (TW)

( * ) Notice: Subject to any disclaimer, the term of this patent is extended or adjusted under 35 U.S.C. 154(b) by 176 days.

(21) Appl. No.: 11/456,513

(22) Filed: Jul. 10, 2006

(65) Prior Publication Data

US 2006/0272167 A1 Dec. 7, 2006

(30) Foreign Application Priority Data

Jul. 6, 2005 (TW) .............................. 94122876 A (51) Int. Cl.
*G01C 5/00* (2006.01)
*G01C 9/00* (2006.01)

(52) U.S. Cl. ..................... 33/290; 33/702; 33/366.11

(58) Field of Classification Search .................... 33/290
See application file for complete search history.

(56) References Cited

U.S. PATENT DOCUMENTS

| 4,918,608 | A | * | 4/1990 | Middleton et al. ............ 701/50 |
| 5,914,778 | A | | 6/1999 | Dong |
| 6,182,372 | B1 | * | 2/2001 | Lamm ......................... 33/290 |
| 6,621,560 | B2 | * | 9/2003 | Greco ...................... 33/366.11 |
| 6,762,830 | B1 | | 7/2004 | Connolly |
| 7,013,571 | B2 | | 3/2006 | El-Katcha et al. |
| 7,095,486 | B2 | * | 8/2006 | Greco ...................... 33/366.21 |
| 2002/0144418 | A1 | * | 10/2002 | Endo et al. ................ 33/366.24 |
| 2006/0053645 | A1 | * | 3/2006 | Rock et al. ................ 33/366.11 |

FOREIGN PATENT DOCUMENTS

JP 04050614 A * 2/1992

* cited by examiner

*Primary Examiner*—Christopher W Fulton (57) ABSTRACT

A laser level with temperature control device (2) and the temperature control method thereof are disclosed. The temperature control device includes a thermal insulation chamber (22), a thermoelectric cooler (25), a control unit (21), and first and second temperature sensors (23, 24). The second temperature sensor is received in the thermal insulation chamber together with a tilt sensor (12). The control unit controls operation of the thermoelectric cooler according to the external and internal temperature signals respectively output by the first and second temperature sensors, so as to adjust the internal temperature inside the thermal insulation chamber to be a calibration temperature point close to the external temperature. Accordingly, the temperature drift problem can be addressed, and the working temperature of the tilt sensor can be maintained in a stable range. Further, the acceptable ambient temperature range within which the tilt sensor works can be expanded.

20 Claims, 5 Drawing Sheets

LASER LEVEL WITH TEMPERATURE CONTROL DEVICE AND TEMPERATURE CONTROL METHOD THEREOF

BACKGROUND OF THE INVENTION

1. Field of the Invention

The present invention relates to a laser level, and in particular to a laser level with temperature control device for compensating adverse effects brought to the absolute measurement accuracy of a tilt sensor of the laser level by temperature drift, and a temperature control method thereof.

2. Description of Prior Art

A laser level utilizes the characteristic of excellent linearity of laser beams to measure or verify a horizontal line/surface or a vertical line/surface by a laser beam emitted by a laser emitter. Because of convenience in use and increasingly affordable cost, the laser levels are accepted by users and have been widely used in the constructing or assembling process of construction projects and large machines. U.S. Pat. Nos. 5,914,778, 6,762,830 and 7,013,571 each disclose a conventional laser level.

However, it has been found that tilt sensors incorporated in most laser levels encounter with the problem of temperature drift with ambient temperature changes, which adversely affects measurement accuracy of the laser level. Currently, two solutions have been proposed to address this problem. One is to indicate to the user in the laser level specification or relevant product documents that the specified measurement accuracy of the laser level is a relative accuracy at approximately the same ambient temperature conditions, not the absolute accuracy within the operating temperature range of 0° C.-40° C. In addition, the temperature drift coefficient will be provided in the specifications. For example, the measurement accuracy is 0.01° C., and the temperature drift coefficient is 0.01°/° C. This solution helps the user roughly evaluate the measurement accuracy of the laser level according to the ambient temperature at measurement time, but provides no substantial aid in increasing the measurement accuracy of the laser level. Another solution is to provide compensation for temperature drift so as to increase the measurement accuracy. Reading values of the tilt sensor at different temperature points are first recorded in the form of a lookup table, and then temperature drift compensation is performed by software functions. By this method, the measurement accuracy of the laser level can be increased. However, the number of temperature points measured in factory for calibration is limited. Thus, it cannot be promised that a corresponding calibrated value can be found in the lookup table for every temperature variation in practical use. Accordingly, a certain accuracy tolerance still exists.

SUMMARY OF THE INVENTION

Accordingly, one object of the present invention is to provide a laser level with temperature control device which cancels the adverse effects of temperature drift on the absolute accuracy of a tilt sensor of the laser level, increases the measurement accuracy of the laser level, and enlarges the acceptable ambient temperature range within which the laser level can normally work.

Another object of the present invention is to provide a temperature control method for a laser level, by which the working temperature of a tilt sensor of the laser level can be maintained in a stable range and can be calibrated to be close to the ambient temperature according to the ambient temperature variations, thereby canceling the adverse effects of temperature drift on the measurement accuracy of the laser level.

To achieve the first object of the present invention, a laser level with temperature control device in accordance with the present invention includes a level adjustment device, a temperature control device, and a laser device. The level adjustment device comprises a tilt sensor, a processor unit, and an actuator. The processor unit is adapted to receive the output signal of the tilt sensor and then proceeds with calculation. The actuator is controlled by the processor unit to adjust the tilt sensor to a desired horizontal position. The temperature control device comprises a thermal insulation chamber, a temperature adjustment unit, a control unit, a first temperature sensor, and a second temperature sensor. The temperature adjustment unit may be in the form of a thermoelectric cooler that adjusts the internal temperature inside the thermal insulation chamber by means of voltage changes. The second temperature sensor and the tilt sensor are both received in the thermal insulation chamber. The first temperature sensor detects the external temperature outside the thermal insulation chamber, and the second temperature sensor detects the internal temperature inside the thermal insulation chamber. The control unit receives the temperature signals from the first and second temperature sensors, and correspondingly controls the operation of the temperature adjustment unit to adjust the internal temperature inside the thermal insulation chamber. The laser device is movable following the movement of the tilt sensor of the level adjustment device, whereby a desired horizontal position of the laser device can also be obtained with the positional adjustment movement of the tilt sensor.

To achieve the second object of the present invention, a temperature control method for a laser level in accordance with the present invention comprises the following steps: first, obtaining the detected value of the tilt sensor at each calibration temperature point $T_x$ that is set in P° C. increment (P is a constant) within the working temperature range $T_0$ to T of the tilt sensor, $T_x$ including $T_0$, $T_1 = T_0 + P$, $T_2 = T_0 + 2P$, ... $T_x = T_0 + XP$; disposing the tilt sensor in a sealed thermal insulation chamber with internal temperature control; detecting the external temperature $T_w$ outside the thermal insulation chamber by the first temperature sensor, if the external temperature $T_w$ exceeds the working temperature range $T_0$-T of the tilt sensor, that is, $T_w < T_0$ or $T_w > T$, controlling the internal temperature inside the thermal insulation chamber to be equal to the lower working temperature limit $T_0$ or the upper working temperature limit T; if the external temperature $T_w$ is within the working temperature range $T_0$-T of the tilt sensor, controlling the internal temperature inside the thermal insulation chamber to be $T_x$ which satisfies the condition $|T_x - T_w| < P/2$° C.; and proceeding with temperature drift compensation by means of software based on the predetected value of the tilt sensor at calibration temperature points $T_x$ to increase the absolute accuracy of the laser level.

In the above temperature control method, the internal temperature inside the thermal insulation chamber is detected by a second temperature sensor.

The detected temperature values of the first and second temperature sensors are applied to a control unit for calculation.

The internal temperature inside the thermal insulation chamber is controlled by a thermoelectric cooler, which is in turn controlled by the control unit.

When the external temperature $T_w$ detected by the first temperature sensor is smaller than the lower working temperature limit $T_0$ of the tilt sensor, the internal temperature inside the thermal insulation chamber is controlled to be equal to $T_0$. When the external temperature $T_w$ detected by the first temperature sensor is greater than the upper working temperature limit T of the tilt sensor, the internal temperature inside the thermal insulation chamber is controlled to be equal to T.

The laser level with temperature control device of the present invention is substantially different from those of the prior art in that the tilt sensor of the present laser level is disposed in a sealed thermal insulation chamber with internal temperature control. The temperature control device controls and adjusts the internal temperature inside the thermal insulation chamber so that the tilt sensor can work at a calibration temperature point close to the external temperature outside the thermal insulation chamber. Accordingly, the adverse effects on the measurement accuracy of the laser level due to temperature drift can be eliminated, and the working temperature of the tilt sensor can be maintained in a stable range. In addition, even if the external temperature outside the thermal insulation chamber is relatively greater or smaller than the upper or lower working temperature limit of the tilt sensor, the internal temperature inside the thermal insulation chamber can still be adjusted and maintained to be within the preset working temperature range of the tilt sensor, whereby level measurement of the tilt sensor can be performed normally. Therefore, by employing the present temperature control method for a laser level, the long existing temperature drift problem that adversely affects the absolute accuracy of a tilt sensor of the laser level can be effectively solved, the measurement accuracy of the laser level thus can be increased, and the acceptable ambient temperature range within which the laser level works can be expanded to allow the laser level to work at greater and lower ambient temperatures.

BRIEF DESCRIPTION OF THE DRAWINGS

The present invention may best be understood through the following description with reference to the accompanying drawings, in which.

DETAILED DESCRIPTION OF THE PREFERRED EMBODIMENT

Figure 1:
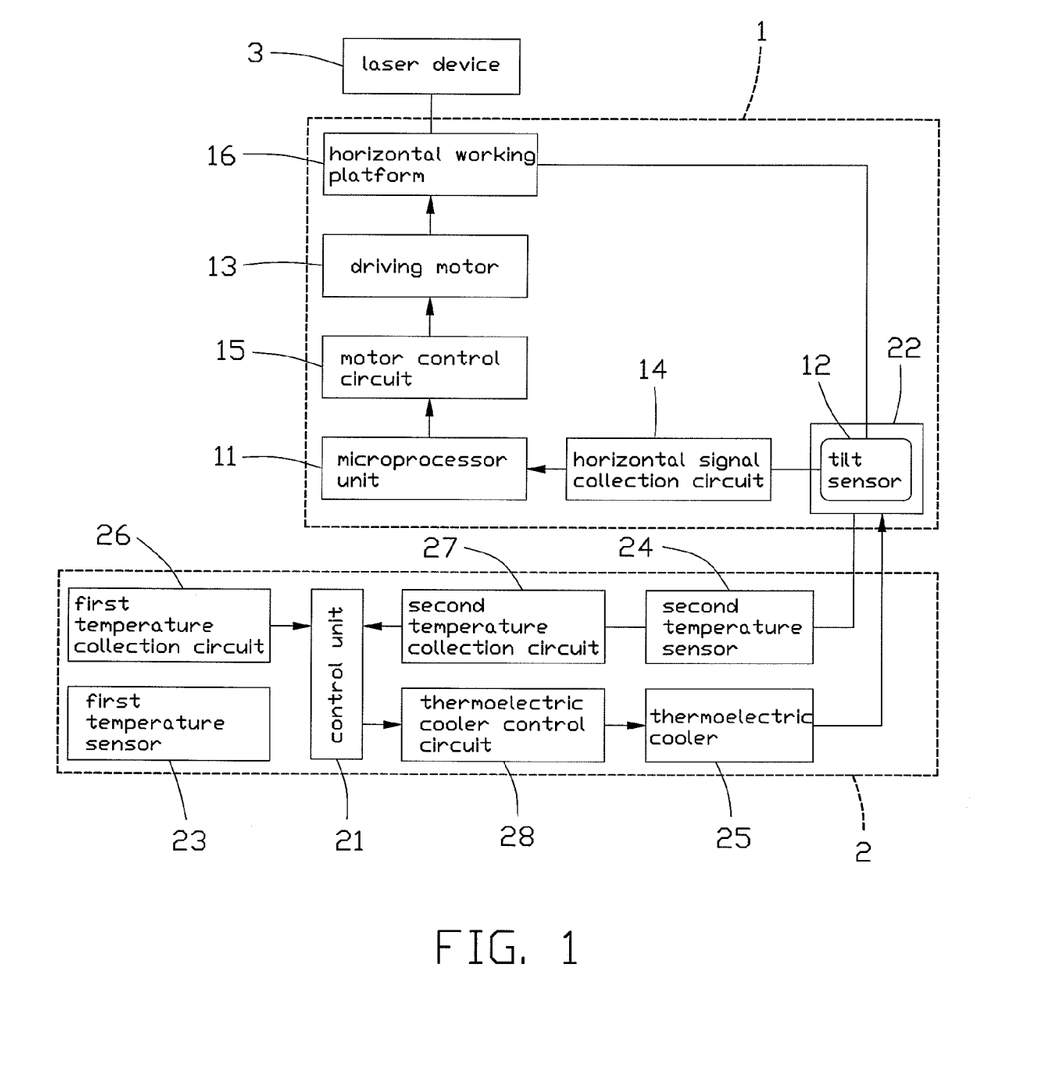
FIG. 1 is a block diagram of a laser level with temperature control device in accordance with the present invention.
Figure 2:
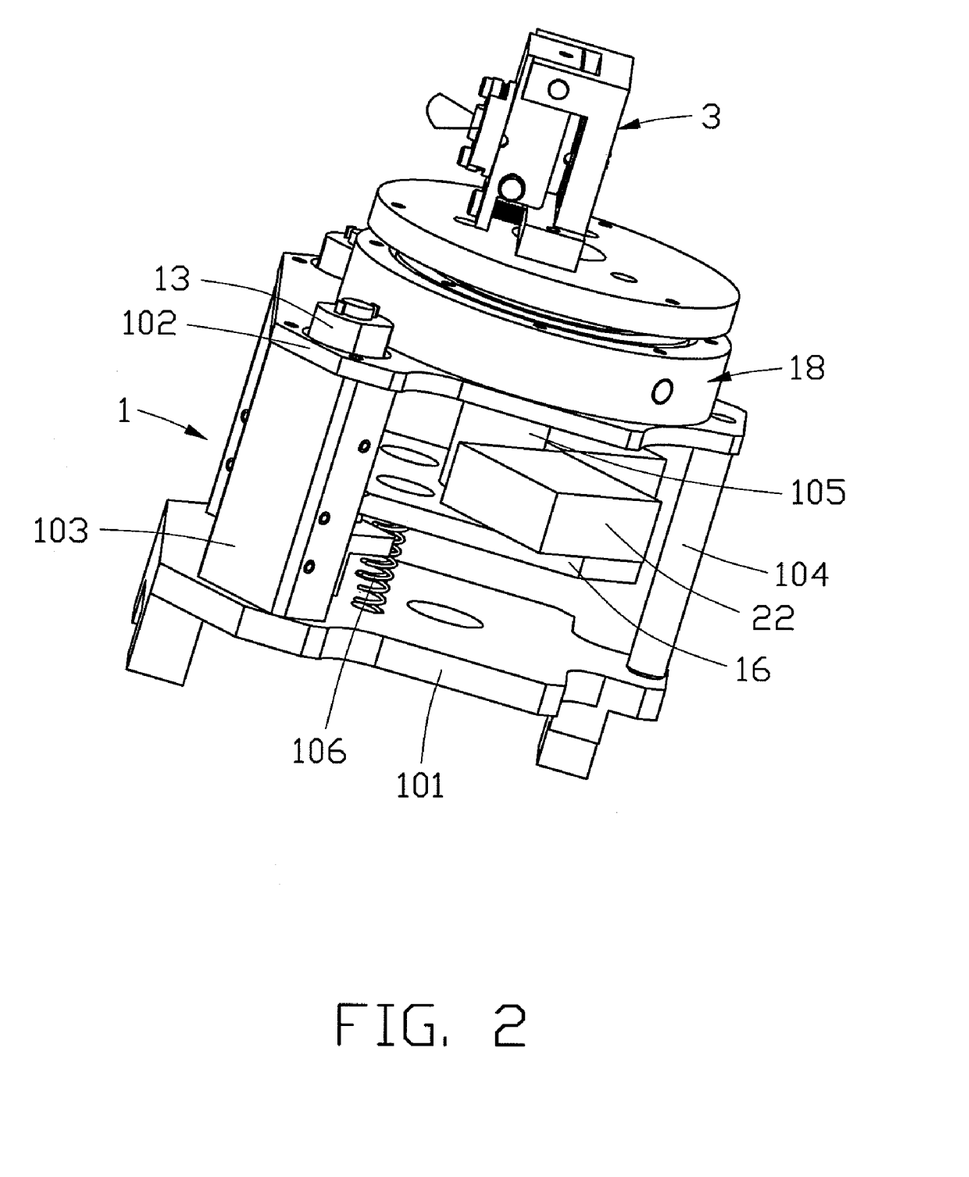
FIG. 2 is a perspective, assembled view of the laser level of the present invention.
Figure 3:
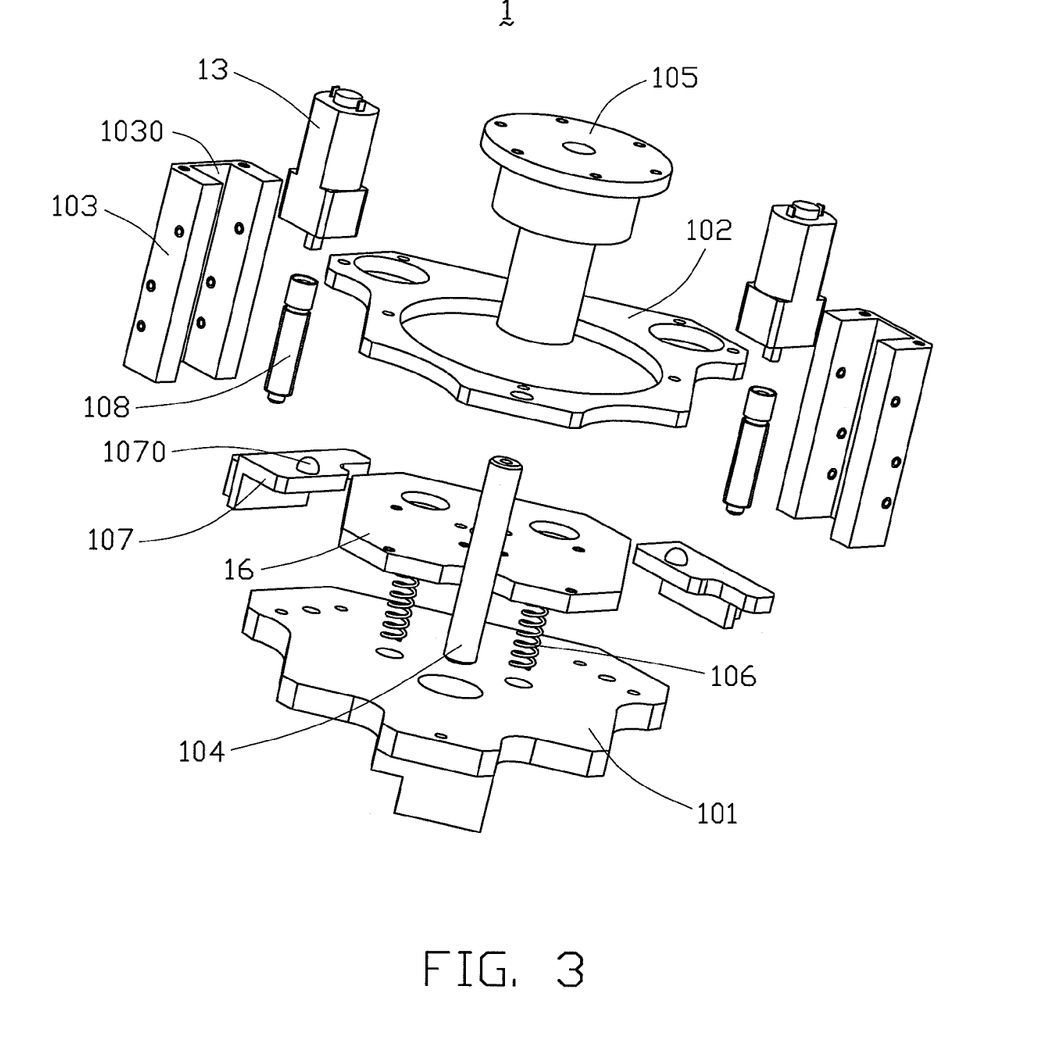
FIG. 3 is a perspective, exposed view of a level adjustment device of the laser level of the present invention.

With reference to the drawings and in particular to FIGS. 1 and 2, which respectively show a block diagram and a perspective, assembled view of a laser level with temperature control device in accordance with the present invention, the laser level of the present invention comprises a level adjustment device 1, a temperature control device 2, and a laser device 3. The level adjustment device 1 comprises a microprocessor unit 11, a tilt sensor 12, an actuator in the form of a pair of driving motors 13, and a horizontal working platform 16. The tilt sensor 12 is disposed on the horizontal working platform 16. In operation, the tilt sensor 12 detects the horizontal inclination angle of the horizontal working platform 16 and outputs a signal to the microprocessor unit 11 through a horizontal signal collection circuit 14. The microprocessor unit 11 comprises a horizontal reference unit and a digital PID (Proportional-Integral-Derivative) control unit (not shown). The horizontal reference unit is adapted to provide a horizontal reference signal to the digital PID control unit. The digital PID control unit proceeds with PID calculations based on the difference between the output signal of the tilt sensor 12 and the horizontal reference signal, and then outputs a control signal to a motor control circuit 15 for actuating the driving motor 13 to correspondingly adjust the horizontal position of the working platform 16. Referring to FIG. 3, the level adjustment device 1 further comprises a lower securing plate 101, an upper securing plate 102, a pair of upright columns 103 each forming a sliding groove 1030 therein, and a supporting post 104. The upright columns 103 and the supporting post 104, which are arranged in a substantially triangular configuration, connect the upper and lower securing plates 101, 102 with each other at a predetermined distance. The horizontal working platform 16 is suspended in the space defined between the upper and lower securing plates 101, 102, and is connected with the rotating ring module 18 by a connecting member 105 (see FIG. 2). A pair of sliders 107 is slidably received in the corresponding sliding grooves 1030 of the upright columns 103, and each connected with the driving motor 13 via a stud 108. When the driving motor 13 is actuated, the stud 18 is correspondingly rotated, and the slider 107 is vertically slidable along the sliding groove 1030 of the upright column 103. A steel ball 1070 is formed on an upper surface of the slider 107. During upward and downward movement of the sliders 107, a lower surface of the horizontal working platform 16 reliably abuts against the steel balls 1070 of the sliders 107, contributing to the resilient force provided by two springs 106 disposed between the working platform 16 and the lower securing plate 101. This force also ensures reliable engagement between the slider 107 and the stud 108.

Figure 4:
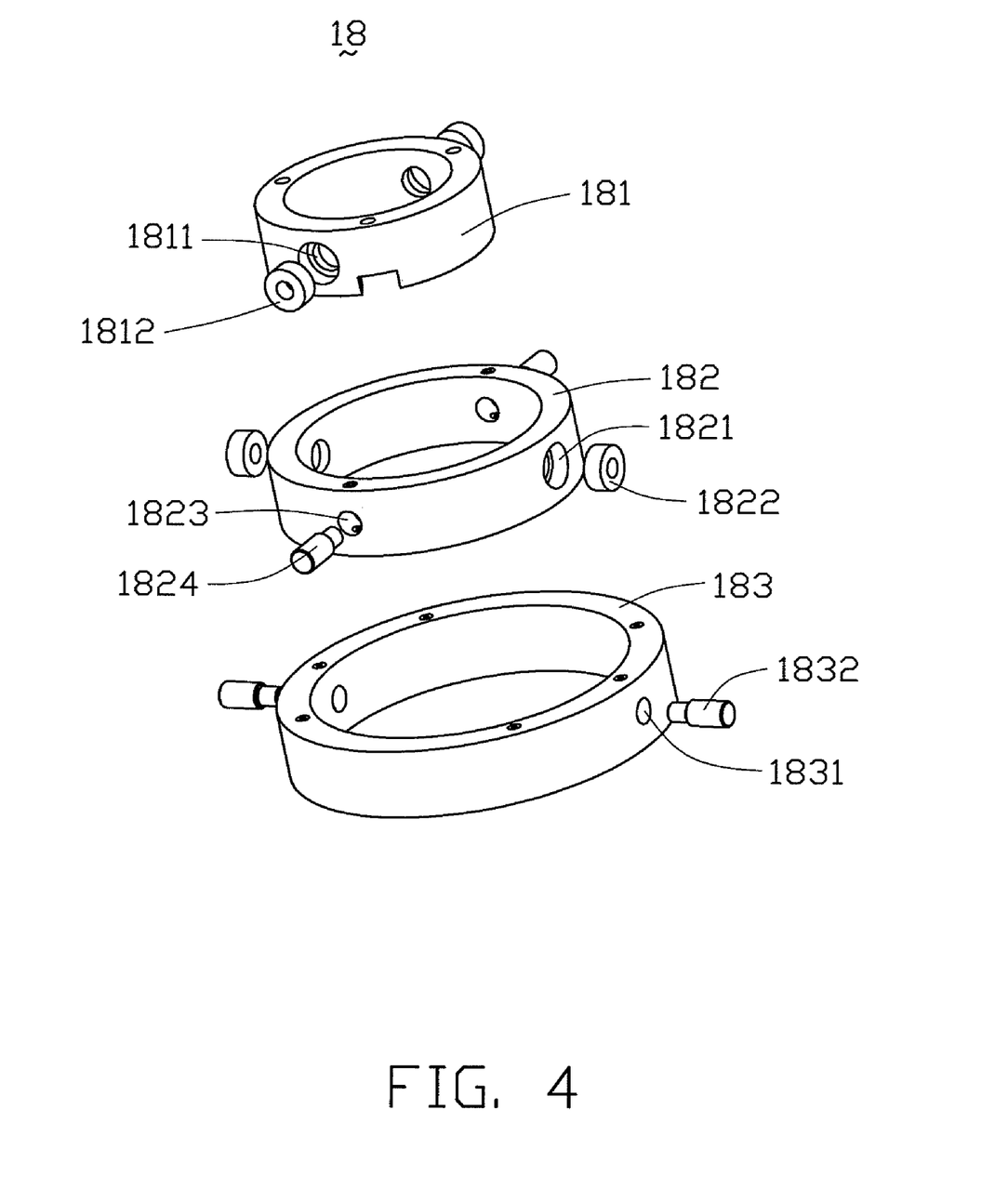
FIG. 4 is a perspective, exposed view of a rotating ring module of the laser level of the present invention.

As shown in FIG. 4, the rotating ring module 18 includes an inner ring 181, a middle ring 182 and an outer ring 183 coaxially nested within each other. A pair of bearing holes 1811, 1821 is defined in the inner ring 181 and the middle ring 182 for receiving a pair of bearings 1812, 1822 therein. A pair of axle holes 1823, 1831 is defined in the middle ring 182 and the outer ring 183. The bearing holes 1811 and the bearings 1812 of the inner ring 181 are aligned with the axle holes 1823 of the middle ring 182 for allowing a pair of axle rods 1824 to sequentially extend into the axle holes 1823 and the bearings 1812, whereby the inner ring 181 is rotatably connected to the middle ring 182 around the axle rods 1824. Similarly, the bearing holes 1821 and the bearings 1822 of the middle ring 182 are aligned with the axle holes 1831 of the outer ring 183 for allowing a pair of axle rods 1832 to sequentially extend into the axle holes 1831 and the bearings 1822, whereby the middle ring 182 is rotatably connected to the outer ring 183 around the axle rods 1832. As the axis lines of the axle rods 1824 and 1832 are arranged to be orthogonal to each other, the horizontal position of the inner ring 181 can be adjusted in all directions. By actuating the driving motor 13, the horizontal position of the working platform 16 can be adjusted. Consequently, the inner ring 181 of the rotating ring module 18 is moved following the movement of the horizontal working platform 16 due to the provision of the connecting member 105. Therefore, the horizontal position of the laser device 3, which is disposed on the inner ring 181 of the rotating ring module 18, can also be adjusted to conform to the measurement accuracy requirement.

Figure 5:
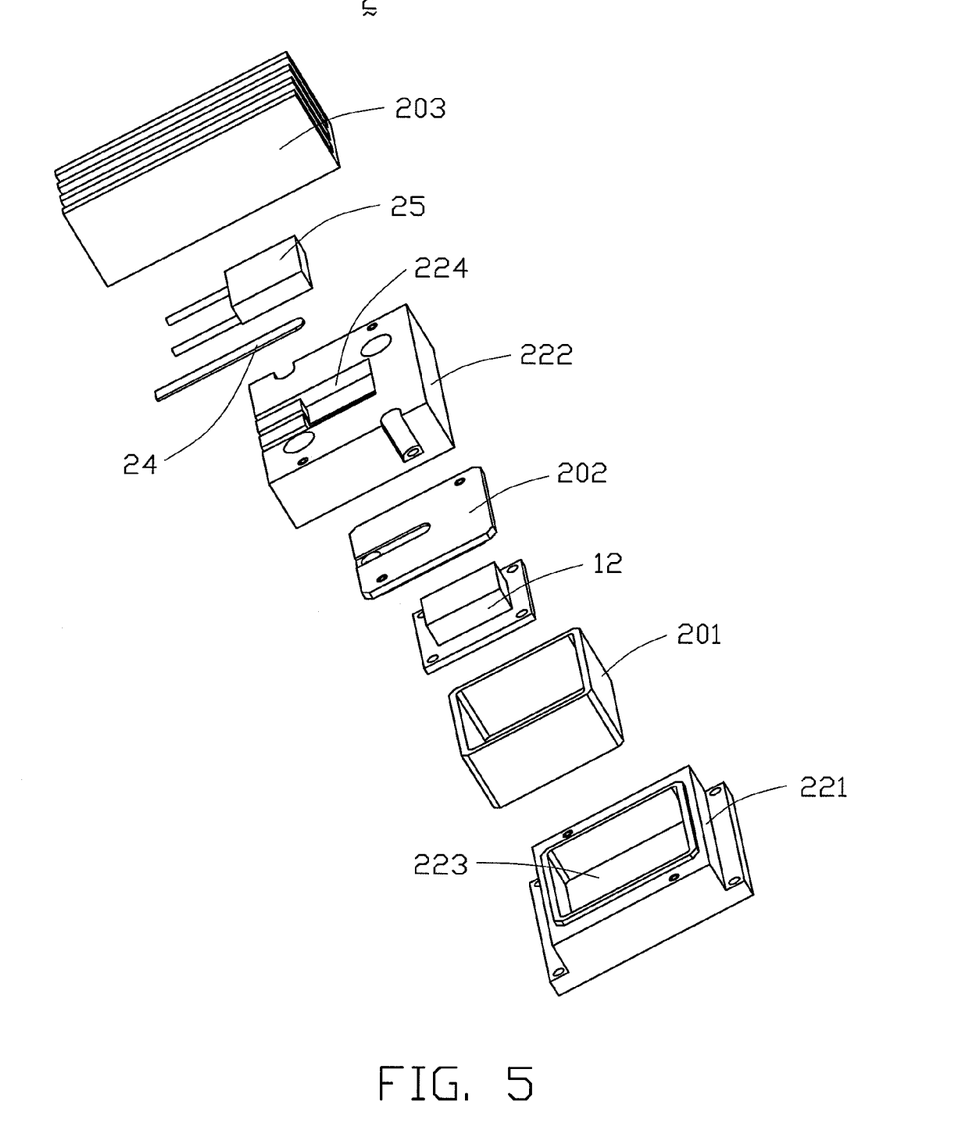
FIG. 5 is a perspective, exposed view of a temperature control device of the laser level of the present invention.

Referring to FIGS. 1, 2, and 5, the temperature control device 2 comprises a thermal insulation chamber 22, a thermoelectric cooler 25, a control unit 21, a first temperature sensor 23, and a second temperature sensor 24. The thermal insulation chamber 22 is disposed on the horizontal working platform 16, and comprises a lower thermal preservation casing 221 and an upper thermal preservation casing 222 capable of being assembled into an integral unit. The lower thermal preservation casing 221 defines a rectangular cavity 223 in an upper surface thereof, and the upper thermal preservation casing 222 defines a channel 224 therethrough. A metal casing 201 receives the tilt sensor 12 therein and is disposed into the cavity 223 of the lower thermal preservation casing 221 together with the tilt sensor 12. A metal cover 202 is further provided on the metal casing 201 so as to hermetically seal the tilt sensor 12 in the metal casing 201. The upper thermal preservation casing 222 receives the second temperature sensor 24 and the thermoelectric cooler 25 in a channel 224 defined therethrough. The second temperature sensor 24 and the thermoelectric cooler 25 are in contact with an upper surface of the metal cover 202. A heat sink 203 is further disposed on the thermoelectric cooler 25. Accordingly, the internal temperature inside the thermal insulation chamber 22 can be detected by the second temperature sensor 24. The external temperature outside the thermal insulation chamber 22 is detected by the first temperature sensor 23. Both the detected temperature signals of the first and second temperature sensors 23, 24 are output to the control unit 21, and are then compared by the control unit 21 to obtain the difference value. A control signal is then output by the control unit 21 to the thermoelectric cooler control circuit 28 to actuate the thermoelectric cooler 25, whereby the internal temperature in the sealed metal casing 201 of the thermal insulation chamber 22 can be adjusted through the metal cover 202. When the internal temperature in the sealed metal casing 201 detected by the second temperature sensor 24 is found to be equal to or close to the external temperature, the control unit 21 sends a corresponding control signal to cease the operation of the thermoelectric cooler 25. Because of the thermal preservation effects of the upper and lower casings 222, 221 of the thermal insulation chamber 22, the working temperature of the tilt sensor 12 can be maintained in a stable range and can be calibrated to be equal to or close to the external temperature outside the thermal insulation chamber 22. Therefore, adverse effects of temperature drift on the measurement accuracy of the laser level can be effectively compensated.

The working temperature of the present laser level can be adjusted or controlled by a temperature control method comprising the following steps:

(a) First, obtaining the detected value of the tilt sensor 12 at each calibration temperature point $T_x$ which is set in P° C. increments (P is a constant) within the working temperature range $T_0$ to T of the tilt sensor 12, $T_x$ including $T_0$, $T1=T_0+P$, $T2=T_0+2P, \ldots T_x=T_0+XP$;

For example, when the working temperature range of the tilt sensor 12 is 0° C.-40° C. and $T_x$ is set in 5° C. increments, the detected value of the tilt sensor 12 at each calibration temperature point $T_x$ ($T_x=0°$ C., 5° C., 10° C., ..., 40° C.) is first obtained.

(b) disposing the tilt sensor 12 in a sealed thermal insulation chamber 22 and controlling the internal temperature inside the sealed thermal insulation chamber 22;

As described above, the tilt sensor 12 is received in the sealed metal casing 201 and then is disposed between the lower and upper thermal preservation casings 221, 222 together with the metal casing 201. By means of the cooperation of the second temperature sensor 24, the thermoelectric cooler 25 and the control unit 21, the internal temperature inside the sealed metal casing 201 can be adjusted and controlled.

(c) detecting the external temperature $T_w$ outside the thermal insulation chamber 22 by the first temperature sensor 23 and accordingly controlling the internal temperature inside the sealed thermal insulation chamber 22 to be $T_x$, $T_x$ satisfying the condition $|T_x-T_w|<P/2°$ C.;

For example, the external temperature $T_w$ outside the sealed thermal insulation chamber 22 detected by the first temperature sensor 23 is 28° C. and the internal temperature inside the sealed thermal insulation chamber 22 detected by the second temperature sensor 24 is 36° C. The two temperature signals are sent to the control unit 21 for comparison calculation. Since the difference value between the external and internal temperatures is 8° C., which exceeds the acceptable P/2° C. difference value, which is 2.5° C. in this case, the control unit 21 outputs a control signal to the thermoelectric cooler control circuit 28 to actuate the thermoelectric cooler 25. The thermoelectric cooler 25 correspondingly reduces the internal temperature inside the sealed thermal insulation chamber 22 to $T_x$, for example, 30° C., which satisfies the condition $|T_x-T_w|<2.5°$ C.

(d) proceeding with temperature compensation by software according to the predetected values by the tilt sensor 22 at the calibration temperature points $T_x$ so as to increase the absolute accuracy of the laser level.

In addition, when the present laser level is worked at an ambient temperature, i.e., the external temperature $T_w$ detected by the first temperature sensor 23, relatively higher or lower than the upper limit or lower limit of the preset working temperature range $T_0$-T of the tilt sensor 12, the internal temperature inside the sealed metal casing 201 of the thermal insulation chamber 22 will be adjusted to be the upper limit or the lower limit of the preset working temperature range to ensure reliable performance of the laser level. This working temperature adjustment function is realized by the control unit 21 that outputs a corresponding control signal to actuate the thermoelectric cooler 25 for internal temperature adjustment. For instance, suppose the working temperature range of the tilt sensor 12 is preset to 0° C.-40° C., when the detected external temperature $T_w$ is $-15°$ C., the internal temperature inside the sealed metal casing 201 will be adjusted and maintained by the thermoelectric cooler 25 to be 0° C., the lower limit of the preset working temperature range of the tilt sensor 12. When the detected external temperature $T_w$ is 56° C., the internal temperature inside the sealed metal casing 201 will be adjusted and maintained by the thermoelectric cooler 25 to be 40° C., the upper limit of the preset working temperature range of the tilt sensor 12. So long as the temperature difference between the external and internal temperatures falls within the working range of the thermal insulation chamber 22 and the temperature control system, persistent and reliable performance of the present laser level can still be ensured.

As described above, the tilt sensor 12 of the present laser level with an internal temperature control device 2 is disposed in a sealed thermal insulation chamber 22. The temperature control device 2 controls and adjusts the internal temperature inside the thermal insulation chamber 22 so that the tilt sensor 12 can work at calibration temperature points close to the external temperature outside the thermal insulation chamber 22. Accordingly, the adverse effects on the measurement accuracy of the laser level due to temperature drift can be eliminated, and the working temperature of the tilt sensor 12 can be maintained in a stable range. In addition, even if the external temperature outside the thermal insulation chamber 22 is relatively greater or smaller than the upper or lower working temperature limit of the tilt sensor 12, the internal temperature inside the thermal insulation chamber 22 can still be adjusted and maintained to be within the preset working temperature range of the tilt sensor 12, whereby level measurement of the tilt sensor 12 can be performed normally. Therefore, by employing the present temperature control method for a laser level, the long existing temperature drift problem that adversely affects the absolute accuracy of a tilt sensor of the laser level can be effectively solved, the measurement accuracy of the laser level thus can be increased, and the acceptable ambient temperature range within which the laser level works can be expanded to allow the laser level to work at greater and lower environmental temperatures.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A laser level comprising:
    a level adjustment device comprising:
        a tilt sensor, which generates an output signal corresponding to a measurement,
        a processor unit, which receives the output signal from the tilt sensor and proceeds with calculation on the output signal, and
        an actuator, which is controlled by the processor unit based on the calculation to a horizontal position of the tilt sensor;
    a temperature control device comprising:
        a thermal insulation chamber, in which the tilt sensor is received,
        wherein the temperature control device detects an external temperature outside the thermal insulation chamber and generates a corresponding first temperature signal, and
        wherein the temperature control device detects an internal temperature inside the thermal insulation chamber and generates a corresponding second temperature signal, and
    a control unit, which receives the first and second temperature signals and, based on the temperature signals, controls a temperature adjustment unit to adjust the internal temperature inside the thermal insulation chamber; and
    a laser device movable with the movement of the tilt sensor of the level adjustment device to correspondingly adjust horizontal position.

2. The laser level as claimed in claim 1, wherein the level adjustment device comprises a horizontal working platform, the thermal insulation chamber with the tilt sensor received therein being disposed on the horizontal working platform, and the horizontal working platform being selectively driven by the actuator to adjust horizontal position.

3. The laser level as claimed in claim 2, wherein the thermal insulation chamber comprises an upper thermal preservation casing and a lower thermal preservation mounted together.

4. The laser level as claimed in claim 3, wherein the thermal insulation chamber comprises a metal casing and a metal cover, and wherein the tilt sensor is received in the metal casing and sealed in the metal casing by the metal cover to form a subassembly, which is in turn received in a cavity defined between the upper and lower thermal preservation casings.

5. The laser level as claimed in claim 4, wherein the upper thermal preservation casing defines a channel therethrough, and wherein the temperature control device and the temperature adjustment unit are received in the channel in contact with the metal cover.

6. The laser level as claimed in claim 5, wherein the temperature adjustment unit comprises a thermoelectric cooler.

7. The laser level as claimed in claim 5, wherein the level adjustment device comprises a lower securing plate, an upper securing plate, a pair of upright columns each defining a sliding groove, and a supporting post, the upright columns and the supporting post connecting the upper and lower securing plates with each other at a predetermined distance.

8. The laser level as claimed in claim 7, wherein the horizontal working platform is suspended in a space defined between the upper and lower securing plates, and wherein the level adjustment device comprises a rotating ring module disposed on the upper securing plate, the horizontal working platform and the rotating ring module being connected with each other by a connecting member.

9. The laser level as claimed in claim 8, wherein the sliding groove of each upright column receives a vertically movable slider therein, the slider being connected with the actuator by a stud.

10. The laser level as claimed in claim 9, wherein the horizontal working platform abuts against the sliders, at least one spring being connected between the horizontal working plate and the lower securing plate for providing the resilient abutting force of the horizontal working platform against the sliders.

11. The laser level as claimed in claim 10, wherein the rotating ring module comprises an inner ring, a middle ring and an outer ring coaxially nested within each other.

12. The laser level as claimed in claim 11, wherein each of the inner ring and the middle ring defines a pair of bearing holes therein, said bearing hole receiving a bearing therein.

13. The laser level as claimed in claim 12, wherein the middle ring comprises a pair of axle holes and a pair of axle rods cooperating with the pair of bearings in the inner ring for allowing rotation of the inner ring relative to the middle ring, and the outer ring comprises a pair of axle holes and a pair of axle rods cooperating with the pair of bearings in the middle ring for allowing rotation of the middle ring relative to the outer ring.

14. The laser level as claimed in claim 13, wherein the axis lines of the axle rods of the middle ring extend in a direction orthogonal to the axis lines of the axle rods of the outer ring.

15. The laser level as claimed in claim 14, wherein the laser device is disposed on the inner ring of the rotating ring module, the horizontal position of the laser device being adjustable by the movement of the inner ring following the movement of the horizontal working platform.

16. A temperature control method for a laser level, the laser level comprising at least a temperature control device, a tilt sensor, a control unit and a thermal insulation chamber with internal temperature control, the temperature control method comprising the following steps:
    (a) obtaining values of detections performed by the tilt sensor at a plurality of calibration temperature points $T_x$, $T_x$ being set in P° C. increments within a working temperature range $T_0$ to T of the tilt sensor;
    (b) detecting an internal temperature of thermal insulation chamber by the temperature control device;
    (c) detecting an external temperature $T_w$ outside the thermal insulation chamber by the temperature control device;

(d) controlling the internal temperature inside the thermal insulation chamber to be $T_x$ according to the detected external temperature $T_w$, where $T_x$ satisfies the condition $|T_x-T_w|<P/2°$ C.; and (e) proceeding with temperature compensation by software according to the predetected values by the tilt sensor at the calibration temperature points $T_x$ so as to increase the absolute accuracy of the laser level.

17. The temperature control method for a laser level as claimed in claim 16, wherein the predetected value by the tilt sensor at each calibration temperature point $T_x$ is a temperature compensation value for the tilt sensor at that calibration temperature point.

18. The temperature control method for a laser level as claimed in claim 16, which, before step (d), further comprises a step of inputting the detected temperature values of the temperature control device into the control unit for calculation.

19. The temperature control method for a laser level as claimed in claim 18, wherein, in step (d), the internal temperature inside the thermal insulation chamber is controlled by a thermoelectric cooler, the operation of the thermoelectric cooler being controlled by the control unit.

20. The temperature control method for a laser level as claimed in claim 16, wherein step (d) comprises a substep of determining whether the detected external temperature $T_w$ by the temperature control device is within the working temperature range $T_0$ to T of the tilt sensor, and if the detected external temperature $T_w$ falls below the lower working temperature limit $T_0$, controlling the internal temperature inside the thermal insulation chamber to be $T_0$; if the detected external temperature $T_w$ exceeds the upper working temperature limit T, controlling the internal temperature inside the thermal insulation chamber to be T; and if the detected external temperature $T_w$ falls within the working temperature range $T_0$ to T, controlling the internal temperature inside the thermal insulation chamber to $T_x$, $T_x$ satisfying the condition $|T_x-T_w|<P/2°$ C.

* * * * *